(12) United States Patent
Wallace et al.

(10) Patent No.: US 9,479,223 B2
(45) Date of Patent: Oct. 25, 2016

(54) METHOD AND APPARATUS IN A COMMUNICATIONS NETWORK

(71) Applicant: BRITISH TELECOMMUNICATIONS PUBLIC LIMITED COMPANY, London (GB)

(72) Inventors: Andrew David Wallace, London (GB); Peter David Wilson, London (GB); Leslie Derek Humphrey, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/772,588

(22) PCT Filed: Mar. 4, 2014

(86) PCT No.: PCT/GB2014/000079
§ 371 (c)(1),
(2) Date: Sep. 3, 2015

(87) PCT Pub. No.: WO2014/135832
PCT Pub. Date: Sep. 12, 2014

(65) Prior Publication Data
US 2015/0381236 A1    Dec. 31, 2015

(30) Foreign Application Priority Data
Mar. 5, 2013   (EP) .................................... 13250025

(51) Int. Cl.
| H04M 1/24 | (2006.01) |
|---|---|
| H04M 3/08 | (2006.01) |
| H04M 3/22 | (2006.01) |
| H04B 3/54 | (2006.01) |
| H04M 11/06 | (2006.01) |
| H04M 3/30 | (2006.01) |
| H04M 3/34 | (2006.01) |

(52) U.S. Cl.
CPC ............. *H04B 3/544* (2013.01); *H04M 3/304* (2013.01); *H04M 3/34* (2013.01); *H04M 11/062* (2013.01)

(58) Field of Classification Search
None
See application file for complete search history.

(56) References Cited

U.S. PATENT DOCUMENTS

| 4,621,366 | A |  | 11/1986 | Cain et al. |  |
|---|---|---|---|---|---|
| 5,914,982 | A |  | 6/1999 | Bjarnason et al. |  |
| 2006/0095581 | A1 |  | 5/2006 | Ali et al. |  |
| 2006/0198500 | A1 | * | 9/2006 | Defoort | ............... H04L 12/2697 379/1.01 |
| 2011/0007623 | A1 | * | 1/2011 | Cendrillon | ............... H04B 3/32 370/201 |
| 2011/0142111 | A1 | * | 6/2011 | Sands | ................... H04M 11/062 375/222 |
| 2011/0206102 | A1 | * | 8/2011 | Fang | ..................... H04M 11/062 375/222 |
| 2012/0026908 | A1 | * | 2/2012 | Tzannes | .................. H04L 41/12 370/252 |
| 2013/0325965 | A1 | * | 12/2013 | Egan | ...................... H04L 65/403 709/204 |

FOREIGN PATENT DOCUMENTS

EP        2 343 832         7/2011

OTHER PUBLICATIONS

International Search Report for PCT/GB2014/000079, mailed Apr. 10, 2014, 3 pages.

* cited by examiner

*Primary Examiner* — Quoc D Tran
(74) *Attorney, Agent, or Firm* — Nixon & Vanderhye PC

(57) ABSTRACT

The present invention provides a method of training a DSL link while transmitting data over a powerline connection. If the powerline connection causes interference on the DSL link then this will be present during the line training, giving a more robust set of line parameters.

17 Claims, 6 Drawing Sheets

METHOD AND APPARATUS IN A COMMUNICATIONS NETWORK

This application is the U.S. national phase of International Application No. PCT/GB2014/000079 filed 4 Mar. 2014, which designated the U.S. and claims priority to EP Patent Application No. 13250025.7 filed 5 Mar. 2013, the entire contents of each of which are hereby incorporated by reference.

TECHNICAL FIELD

The present invention relates to a communications network and in particular to a communications network using digital subscriber line (DSL) technology.

BACKGROUND AND SUMMARY

Asymmetric digital subscriber line (ADSL) systems enable data to be transmitted over a pair of metallic twisted pair (usually copper) wires to customer premises. It is thought that the maximum transmission performance that is likely to be obtained with modern variants of ADSL is a download data rate of 24 Mbps and an upload speed of about 3 Mbps. Such data rates are dependent on the length of the metallic twisted pair from the customer premises to the telephone exchange and thus many customers will receive services at significantly lower data rates.

To improve data rates optical fibre has been installed into the access network. The greatest data rates are likely to be provided using fibre to the premises (FTTP) networks, such as passive optical networks (PONs), but there is a significant cost involved in providing fibre to customer premises. Fibre to the cabinet (FTTCab) networks are known to provide an attractive solution to providing customers with high data rate services without requiring as much investment as FTTP networks. Typically in FTTCab networks, very high bit-rate digital subscriber line (VDSL) systems are used to provide data rates of 40 Mbps and higher, for both upload and download on the metallic twisted pair cables. It is believed that improvements to VDSL systems may provide data rates in excess of 100 Mbps.

DSL systems work by utilising the frequencies above those which are used by the conventional telephony signals. In particular, VDSL2 defines three frequency windows for downstream data and 2 frequency windows for upstream data. Each of these windows comprises a number of carriers which have a 4.3125 kHz frequency separation. Each of these carriers will transmit one or more symbols with each of these symbols being used to transmit up to 15 bits of data. During a training process the insertion loss and noise level are determined for each of the carriers such that the signal to noise ratio (SNR) for each carrier can be determined. The training process determines the capacity of the upstream and downstream links in accordance with the SNRs of each of the carriers.

According to a first aspect of the present invention there is provided an apparatus having a first digital subscriber line connection to a first communications network and a second connection to a local area network, the apparatus being configured to, in use, transmit data via the local area network in response to the initiation of a training process for the digital subscriber line connection.

The apparatus may comprise a modem or a router. The apparatus may be configured, in use, to transmit data to a device connected to the local area network via a powerline adaptor. Data may be transmitted by the apparatus to a set top box or a router via the powerline adaptor. The apparatus may be further configured to cease transmitting data via the local area network in response to the termination of the training process for the digital subscriber line connection.

According to a second aspect of the present invention there is provided a method of operating a communications network, the method comprising the steps of: a) initiating a training process for a digital subscriber line connection with an apparatus connected to a communications network; and b) in response to the initiation of the training process, transmitting data from the apparatus to a local area network. In step b) the apparatus may transmit data to a further device via a powerline adaptor.

The network may comprise the further step of c) ceasing to transmit data to the local area network in response to the termination of the training process for the digital subscriber line connection.

According to a third aspect of the present invention there is provided a tangible data carrier for use in a computing device, the data carrier comprising computer executable code which, in use, performs a method as described above.

BRIEF DESCRIPTION OF THE DRAWINGS

Embodiments of the present invention will now be described, by way of example only, with reference to the accompanying drawings in which.

DETAILED DESCRIPTION

Figure 1:
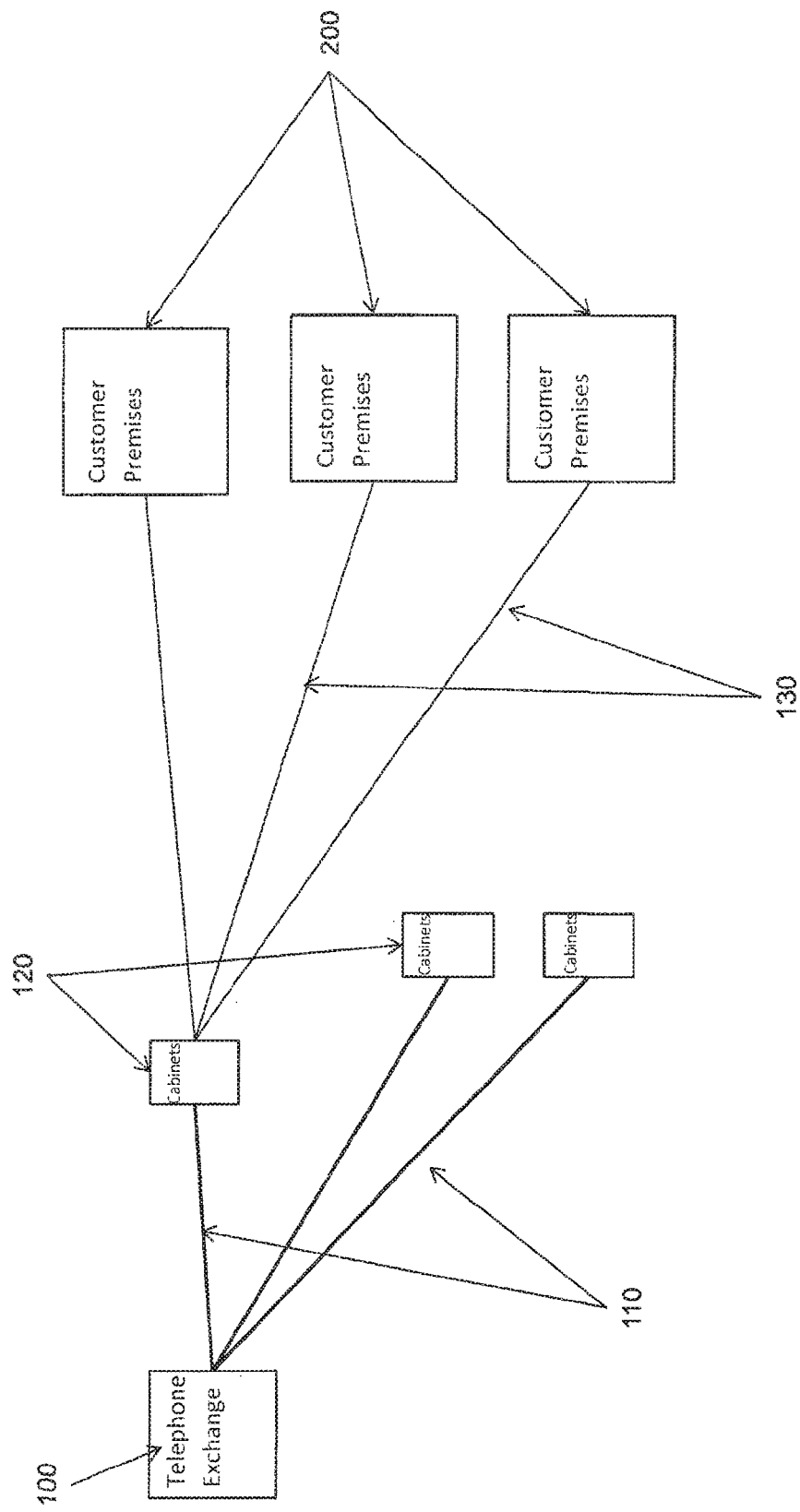
FIG. 1 shows a schematic depiction of a FTTCab network in which a telephone exchange is connected to a plurality of cabinets by optical fibre cables.

FIG. 1 shows a schematic depiction of a FTTCab network in which a telephone exchange 100 is connected to a plurality of cabinets 120 by optical fibre cables 110. These cabinets 120 comprise the opto-electronic equipment necessary to send data to the customer premises 200 over a copper cable 130. Typically, a customer will use the communications network to access the internet and to access data such as video on demand services. Alternatively, the network may be used to transmit television channels which might conventionally be transmitted using a terrestrial or satellite transmission channel.

Figure 2:
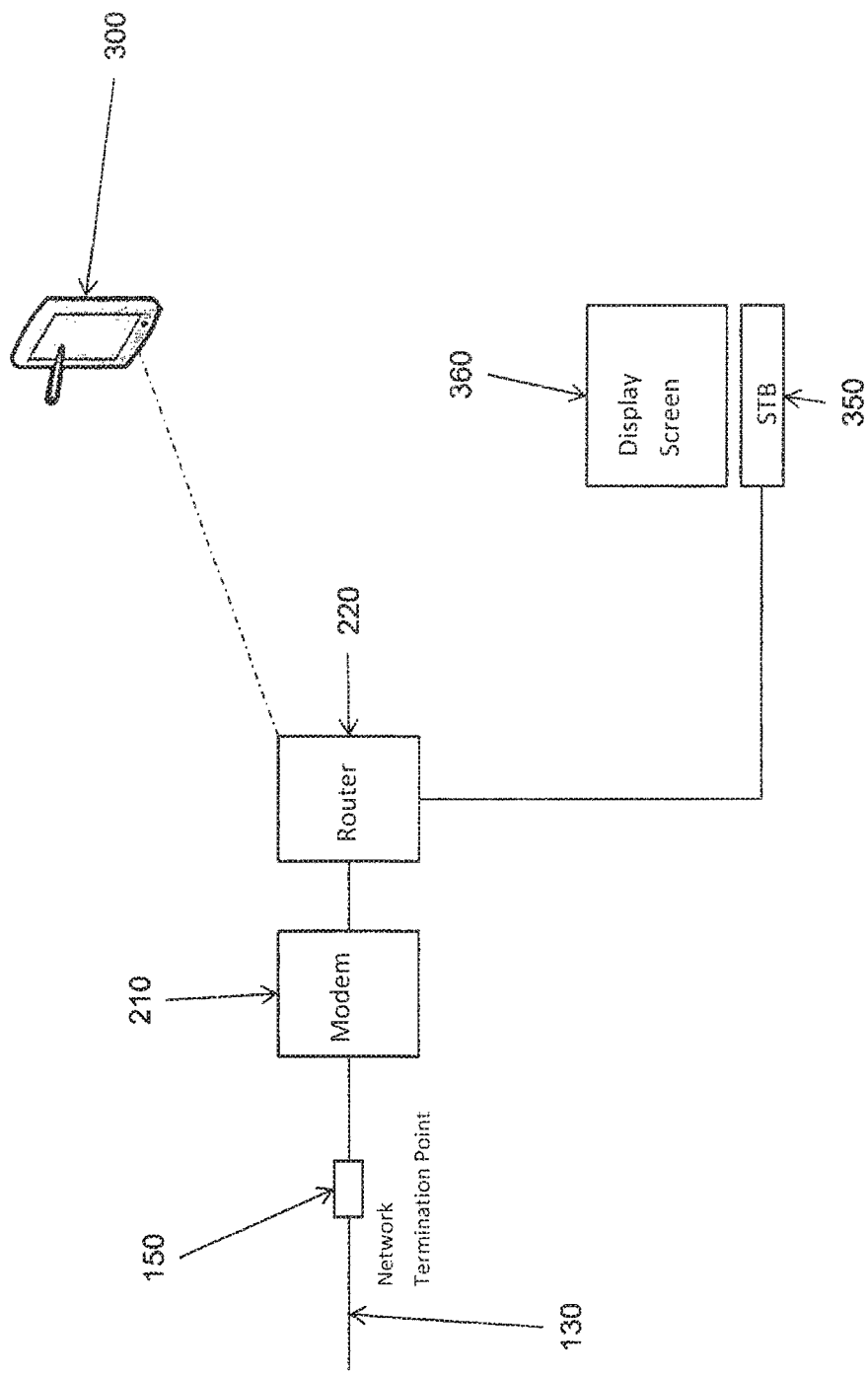
FIG. 2 shows a schematic depiction of the interior of a customer premises in which a modem is connected to the copper cable via a network termination point.

FIG. 2 shows a schematic depiction of the interior of a customer premises in which a modem 210 is connected to the copper cable 130 via network termination point 150. The modem is then connected to a router 220 which can then send data to one or more computers, tablet devices, smartphones etc. 300, either via a Wi-Fi connection or via a cabled connection (not shown). Furthermore, the router may be connected to a set top box (STB) 350, which is connected to television or similar display screen 360, which is used for receiving video on demand services or other video signals transmitted via the copper cable 130. The STB is normally connected to the router via a cabled connection to provide the necessary bandwidth required for the video signals.

Figure 3:
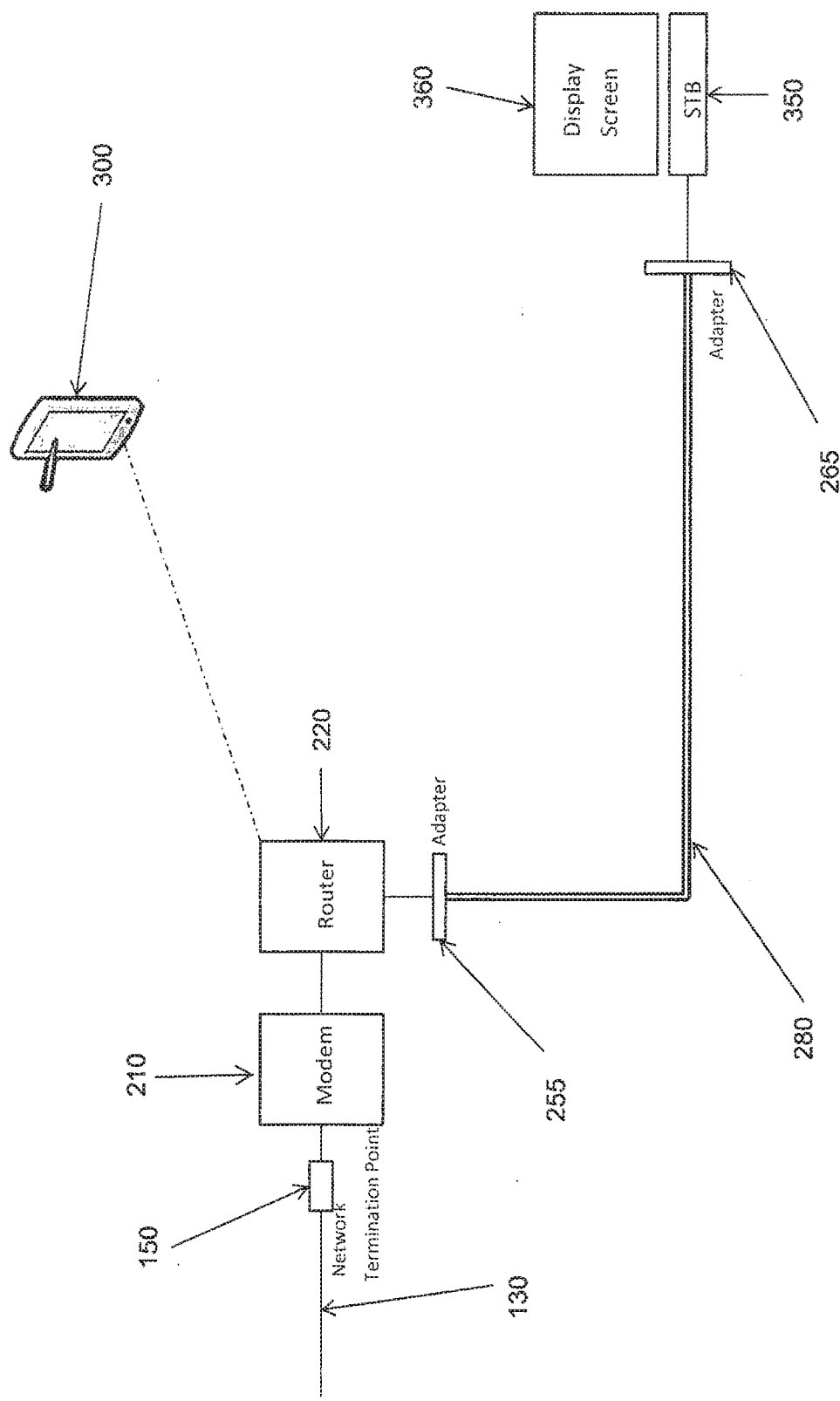
FIG. 3 shows a schematic depiction of the interior of a customer premises showing an alternative network arrangement to that of FIG. 2.

FIG. 3 shows a schematic depiction of the interior of a customer premises showing an alternative network arrangement. It is necessary that the modem and router are co-located near to the network termination point. However, in many domestic premises the network termination point is not located near to, or in the same room as, the television screen 360 to which the STB 350 is connected. Whilst commercial premises often have the trunking or ducting which might allow a data cable (such as a Cat 5 cable which can support Ethernet) to be routed between two different locations, this is not common in domestic premises. Furthermore, the size of a data cable means that such a cable cannot be simply installed in the same manner as telephone extension wiring, for example by tacking it to skirting boards and round door frames. Such a solution has proved to be too visually intrusive. A solution to this problem has been to use power line data adaptors. These adaptors are plugged into the electrical power supply and allow an Ethernet connection to be established over the power line conductors.

FIG. 3 shows that the router 220 is connected to a first power line adaptor 255 and the STB 350 is connected to a second power line adaptor 265. Data is transmitted between the first and second power line adaptors, over the power line 280. Such power line adaptors are capable of transmitting data at rates of up to 500 Mb/s so it will be seen that they are fully capable of transmitting HD video between the router and the STB.

Figure 4:
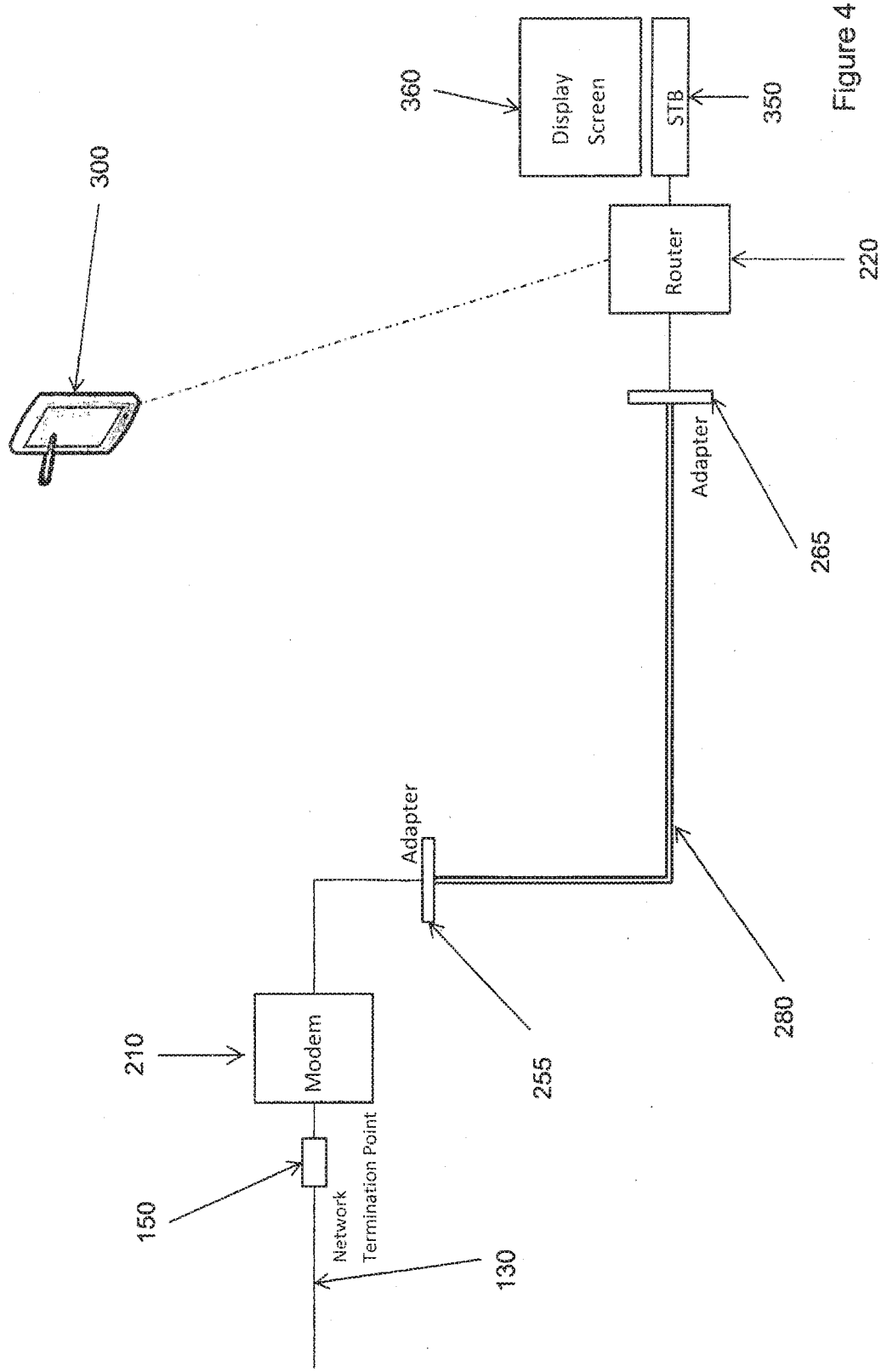
FIG. 4 shows a schematic depiction of the interior of a customer premises showing a yet further alternative network arrangement to that of FIG. 2.

FIG. 4 shows a schematic depiction of the interior of a customer premises showing a yet further alternative network arrangement to that of FIG. 2. The network arrangement shown in FIG. 4 has the modem 210 connected to the first power line adaptor 255 and the second power line adaptor 265 connected to the router 220. The router 220 is directly connected to the STB 350 using, for example, an Ethernet connection.

Figure 5:
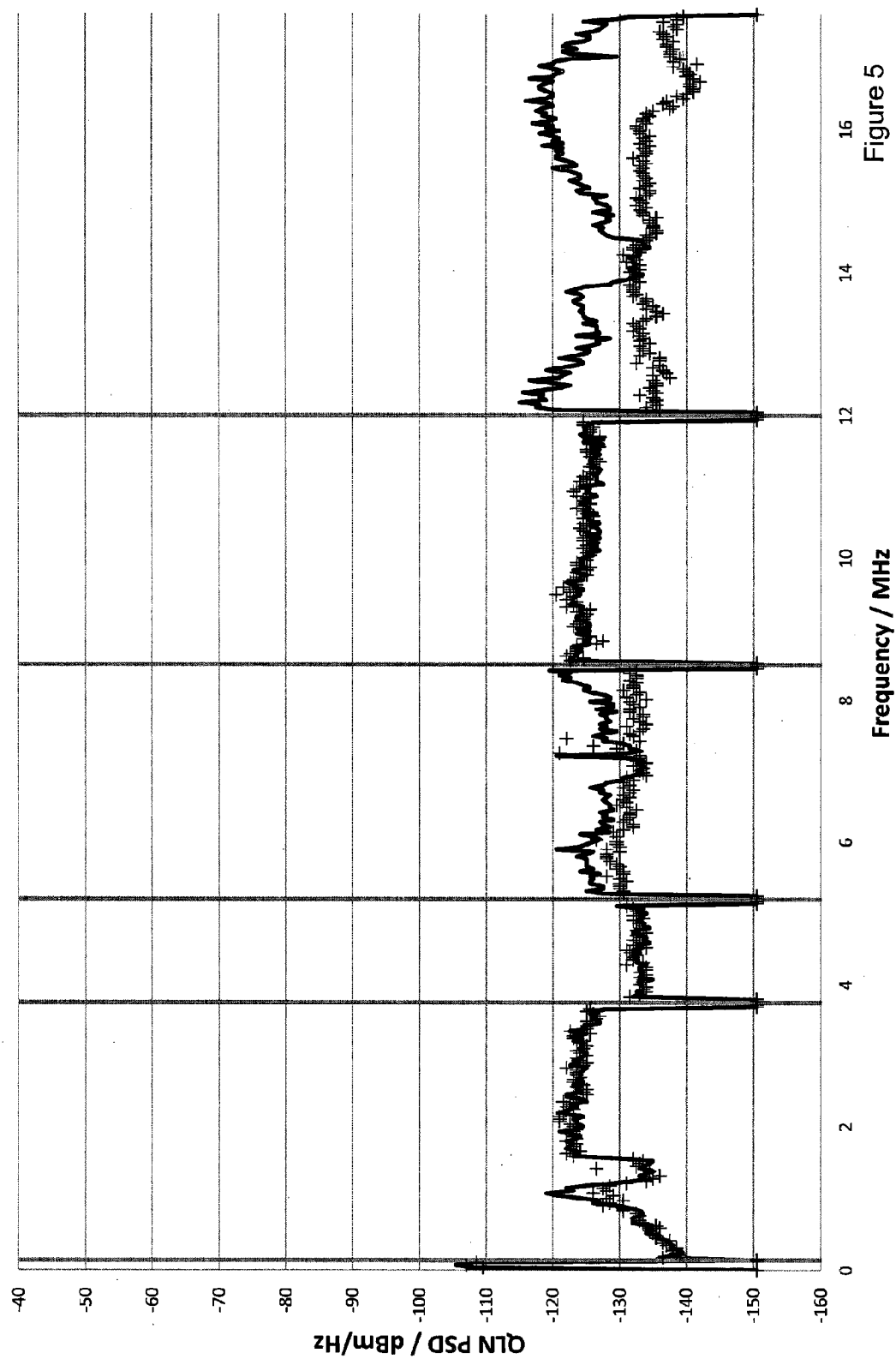
FIG. 5 shows a graphical depiction of the losses experienced on a VDSL line under different circumstances.

It has been observed that some sources of radio interference have a negative effect on the transmission performance of the DSL link. FIG. 5 shows a graphical depiction of the losses experienced on a VDSL line under different circumstances. The data series depicted by a series of crosses shows the quiet line noise due to cross-talk and radio frequency interference (RFI). The data series shown by the solid line shows the quiet line noise which is caused by crosstalk, RFI and an additional time-varying noise source. Such an additional time-varying noise source may be, for example, AM radio transmission, ship-to-shore radio signals or interference from domestic devices such as thermostatic controllers for central heating systems. As such noise sources are not always present, it is likely that the DSL will undergo its training process in the absence of such time-varying noise. When the additional noise signals are present then the error rate will increase, potentially to a level at which further transmissions are not possible.

It has been further observed that power line adaptors can be a time-varying noise source. Some adaptors only send a signal over the power lines when there is a data payload to be transmitted from the router to the STB. Conventionally, when the modem is performing the training process there will be no data payload being sent from the modem to the STB and thus there will be no interference from the power line adaptors. If the power line adaptors do cause interference in operation then this is likely to lead to an increase in errors on the DSL. In extreme cases, the noise caused by the operation of the power line adaptors may cause the DSL link to fail.

During the training process, the modem may prompt the router to transmit data over the power line to the STB. Thus, if the power line adaptors do cause any additional interference then this interference will be present during the training process. The determination of the carrier insertion losses and SNRs will take into account this interference and thus any interference during operation of the DSL link will not lead to an increase in error rate.

Figure 6:
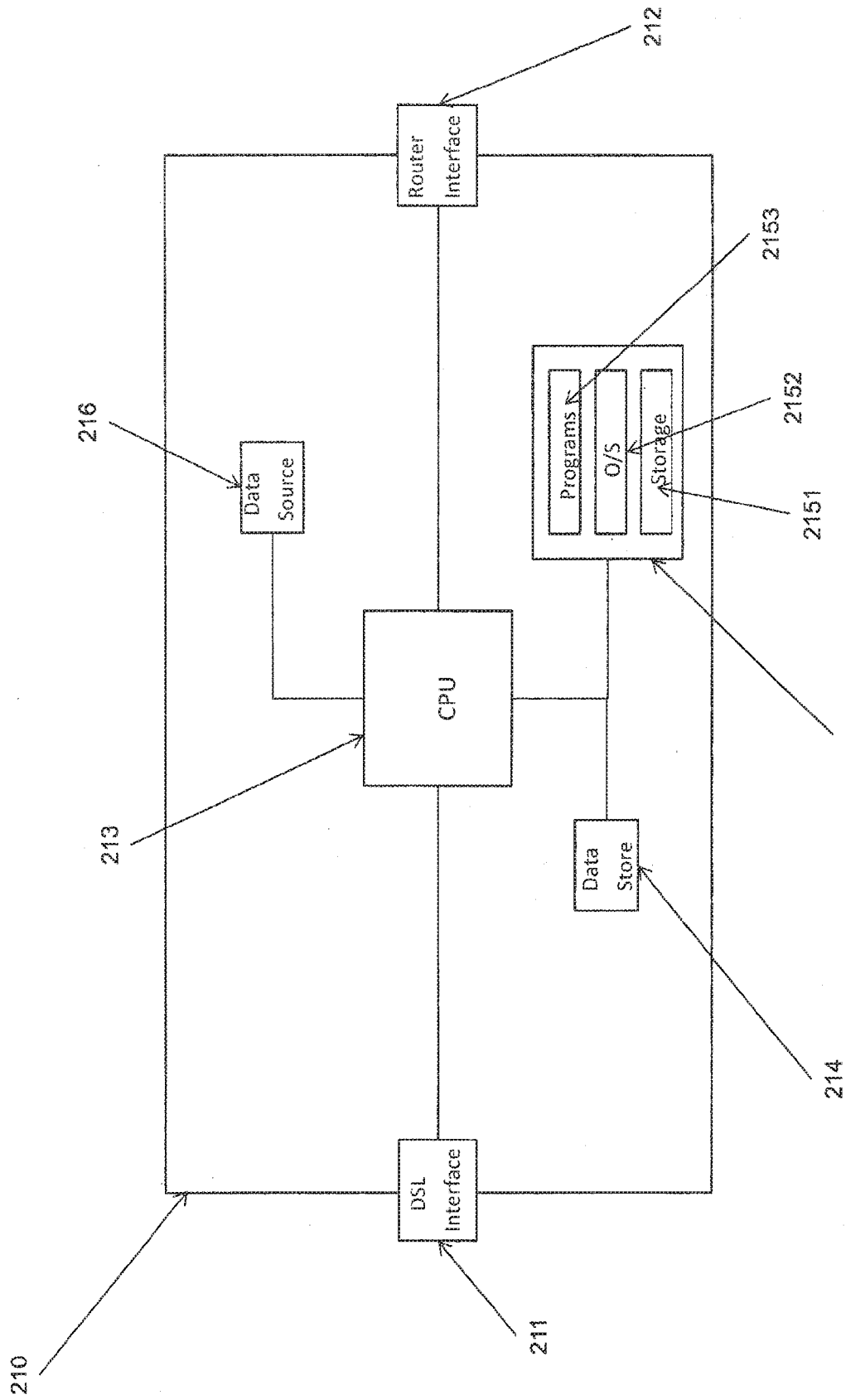
FIG. 6 shows a schematic depiction of a modem configured to perform a method according to the present invention.

FIG. 6 shows a schematic depiction of a modem 210 configured to perform a method according to the present invention. Modem 210 comprises DSL interface 211, router interface 212, CPU 213, volatile data store 214 and non-volatile data store 215. The non-volatile data store comprises data cache and storage 2151, operating system computer program code 2152 which controls the operation of the modem and one or more computer programs 2153 which may be used to enhance or alter the functionality of the modem. Additionally, the modem may comprise a test data source 216, the contents of which may be transmitted to a device or a set-top box during a line training procedure.

In operation, data from the copper cable 130 is routed to the DSL interface 211 via the network termination point 150. The DSL packets are sent to the CPU, where the contents of the packets are extracted and processed, in accordance with any control commands which have been received by the CPU. If the DSL packets contained a payload which is to be transmitted to the STB 350 or a device 300 then the payload is inserted into an Ethernet packet and is sent to the router 220 via the router interface 212. Similarly, data received from the router interface will be processed by the CPU before being transmitted, as required, via the DSL interface to the network for onward transmission.

Periodically, the modem will perform a line training process. This may be initiated by the modem or by an operational support system associated with the network. Conventionally, insertion loss and noise level values are determined for each of the DSL carriers and this data is used to determine a SNR for each of the carriers. The SNR values are then used to determine which carriers are used and how many bits are transmitted per carrier.

In the present invention, when the line training process is initiated, the modem will transmit data to the STB, or another device which is connected to modem via the powerline adaptors. The data transmission preferably continue until the training process is complete. A pattern of data which can be transmitted repeatedly may be stored within the non-volatile data storage means 215, or alternatively within the test data source 216. Alternatively, the test data source may comprise a hardware-based random (or pseudo-random) number generator which can be used to generate a data sequence for transmission to the STB. In a further alternative, the test data source may comprise computer code which can be executed by the CPU to generate a data sequence for transmission to the STB. Also, the Character Generator Protocol (CHARGEN, RFC 864) may be used to generate packets which can be transmitted to the STB. It will be readily understood that the type of data which is generated, or the method by which is generated, is not relevant to the operation of the present invention.

By transmitting data to the STB, if the powerline adaptors do act as an additional time-varying noise source then this noise will be present for the duration of the line training process and thus the effects of the external noise will be taken into account during the line training process. This should reduce the effect of any interference caused by the powerline adaptors during the normal operation of the DSL link. It should be understood that data could be transmitted to any device which has a connection to the modem via the powerline adaptors, not just a STB.

Alternatively, the router 220 could be adapted to transmit data via the powerline adaptors when a line training process is being performed. In such an arrangement, it would be necessary for the modem 210 to send a control signal to the router 220 when a line training process was active and for the router to respond by transmitting the data via the powerline adaptors. Such an adaption may include the incorporation of a test data source within the router.

In the UK, VDSL customers are provided with a modem by the network provider and with a router from their internet service provider due to the regulatory regime that is in operation. If a single apparatus were to be provided which performed the functionality of both the modem and the router then this combined apparatus could be used to transmit data via the powerline adaptors when a line training process is being performed.

The preceding description of the present invention has referred to powerline adaptors. Such adaptors may be compliant with the IEEE 1901-2010 standard for high speed communication via power lines. Alternative technologies exist for transmitting high bit-rate data communications when data cabling is not present exist and it will be understood that the use of such alternative technologies may also cause interference to DSL links. Thus, the powerline adaptors referred to above may also include devices which conform to the following specifications: Home PNA; ITU-T G.hn, HomePlug; and other similar or equivalent technologies. It will be understood that the exact nature of the powerline adaptor is not key to the operation of the present invention. The nature of electrical power cabling is that the transmission of high bit-rate signals is likely to cause interference which can decrease the performance of a DSL line. The present invention does not reduce the interference caused by transmission over the power cabling but ameliorates the unwanted effects of the interference by providing a more robust training process.

It will be understood by the person skilled in the art that the an apparatus according to the present invention may be implemented in hardware alone, in a combination of hardware and software, or in software alone, as is described above. It will be readily appreciated that this will have no effect on the implementation of the present invention.

As the present invention may be implemented on software within a modem (or router), it may be possible to upgrade a conventional modem (or router) to one which can perform a method according to the present invention. Computer code may be deployed to a modem (or router) via download, for example via the internet, or on some physical media, for example, DVD, CD-ROM, USB memory stick, etc. for which the wireless access point has an appropriate media reader.

In summary, the present invention provides a method of training a DSL link whilst transmitting data over a powerline connection. If the powerline connection causes interference on the DSL link then this will be present during the line training, giving a more robust set of line parameters.

The invention claimed is:

1. An apparatus having a first digital subscriber line connection to a first communications network and a second connection to a local area network, the apparatus being configured to, in use, transmit data via the local area network in response to an initiation of a training process for the digital subscriber line connection and determine interference present during the training process.

2. An apparatus according to claim 1, wherein the apparatus comprises a modem.

3. An apparatus according to claim 1, wherein the apparatus comprises a router.

4. An apparatus according to claim 1, wherein the apparatus is configured, in use, to transmit data to a device connected to the local area network via a powerline adaptor.

5. An apparatus according to claim 4, wherein the apparatus is configured, in use, to transmit data to a set top box connected to the local area network via the powerline adaptor.

6. An apparatus according to claim 4, wherein the apparatus comprises a modem which is configured, in use, to transmit data to a router connected to the local area network via a powerline adaptor.

7. An apparatus according to claim 1, wherein the apparatus is configured, in use, to cease transmitting data via the local area network in response to the termination of the training process for the digital subscriber line connection.

8. A method of operating a communications network, the method comprising the steps of:
   a) initiating a training process for a digital subscriber line connection with an apparatus connected to a communications network; and
   b) in response to an initiation of the training process, transmitting data from the apparatus to a local area network and determining interference present during the training process.

9. A method of operating a communications network according to claim 8, wherein in step b) the apparatus transmits data to a further device via a powerline adaptor.

10. A method of operating a communications network according to claim 8, wherein the method comprises the further step of:
    c) ceasing to transmit data to the local area network in response to the termination of the training process for the digital subscriber line connection.

11. A non-transitory tangible data carrier for use in a computing device, the data carrier comprising computer executable code which, in use, performs the method according to claim 8.

12. The apparatus according to claim 1, wherein the apparatus is configured to transmit data to a router connected to the local area network via a plurality of powerline adaptors.

13. The apparatus according to claim 1, wherein the apparatus is configured to transmit data to a set top box connected to the local area network via a plurality of powerline adaptors.

14. The apparatus according to claim 4, wherein the powerline adaptor is a time-varying noise source.

15. The method according to claim 8, wherein data is transmitted to a router connected to the local area network via a plurality of powerline adaptors.

16. The method according to claim 8, wherein data is transmitted to a set top box connected to the local area network via a plurality of powerline adaptors.

17. The method according to claim 9, wherein the powerline adaptor is a time-varying noise source.

* * * * *